Feb. 4, 1930. R. W. BISSELL 1,745,525
APPARATUS FOR MACHINING VALVES, ETC
Filed June 19, 1925
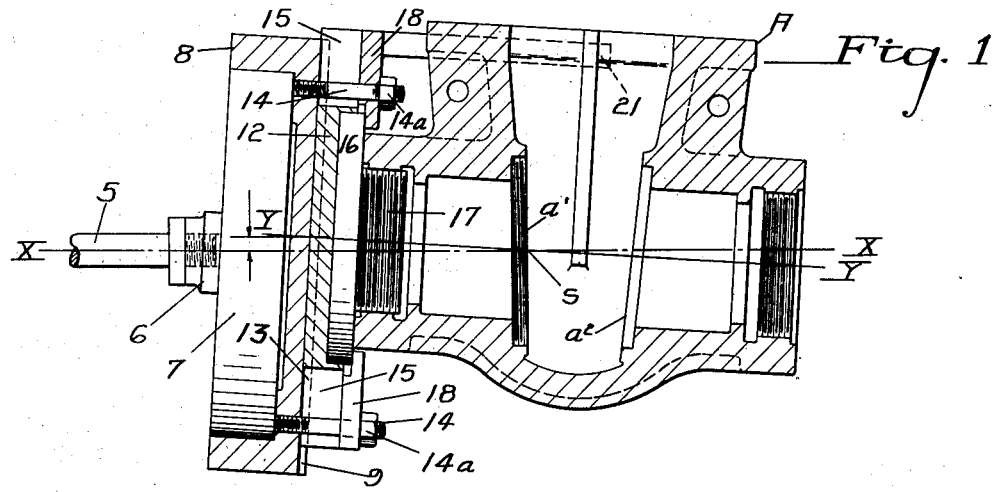
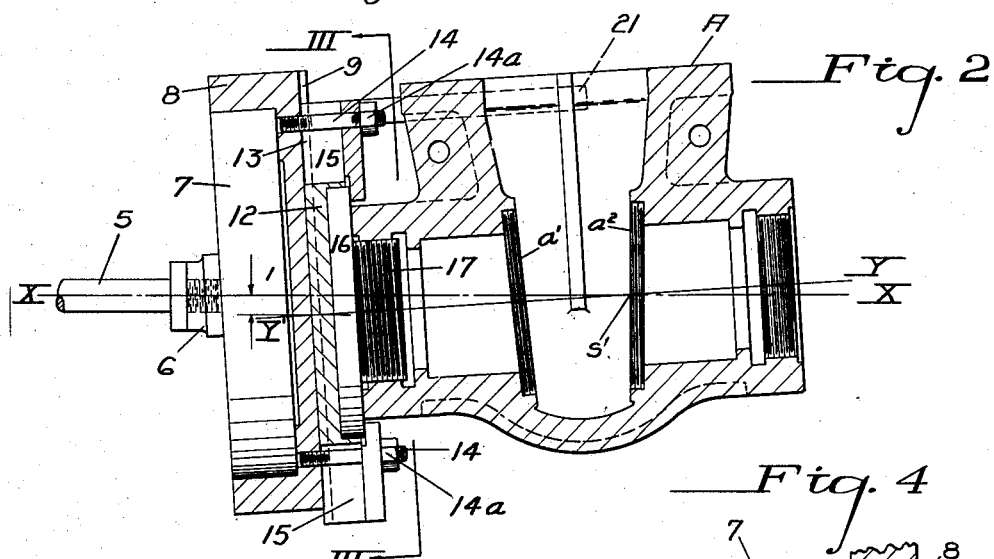
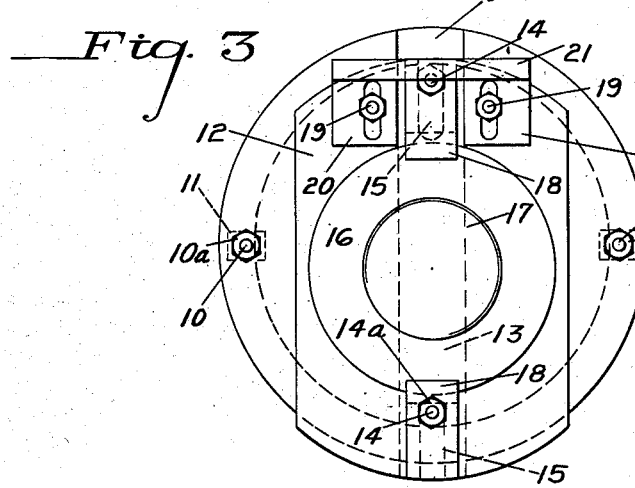
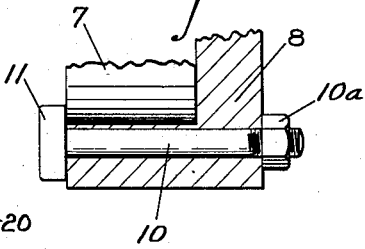
INVENTOR.
Robert W. Bissell
BY
W. G. Doolittle
ATTORNEY.

Patented Feb. 4, 1930

1,745,525

UNITED STATES PATENT OFFICE

ROBERT W. BISSELL, OF PITTSBURGH, PENNSYLVANIA, ASSIGNOR TO KEROTEST MANUFACTURING COMPANY, OF PITTSBURGH, PENNSYLVANIA, A CORPORATION OF PENNSYLVANIA

APPARATUS FOR MACHINING VALVES, ETC.

Application filed June 19, 1925. Serial No. 38,173.

This invention is for a method of and apparatus for the machining of valves and other articles, and particularly for machining valves or other objects of the type having seats or seat ring recesses or other surfaces which are at an angle to the other machined surfaces of the valve or other object.

In the usual gate valve of the wedge-gate type, the valve seats are inclined from a plane perpendicular to the longitudinal axis of the valve. This means that when the valve is set up in a lathe, or other machine, with its longitudinal axis coincident with the axis of rotation of the lathe, the valve seats, or seat ring receiving parts of the valve cannot be machined as such seats have a gyratory motion with respect to the tool.

The usual practice, therefor, in machining such valves is to mount the casting in a lathe and machine the square faces of the valve. Then a wedge plate is put against the face plate of the lathe, and the casting properly set on the wedge plate to machine one of the valve seats. Then the valve is removed, reversed, end for end, and again set up on the wedge plate in proper position to machine the other valve seat. The setting up of the valve on the wedge plate must be very accurately and carefully done. This requires extremely careful measuring in order to prevent error, and consequently consumes a great deal of time. With large heavy valves, it is especially a difficult and time consuming work.

According to the present invention, it is proposed to provide a method and apparatus, whereby, after the square surface of the valve has been machined, the valve can be set up in a lathe, or other machine, and one valve seat quickly finished and then, by a slight adjustment, the other seat can be machined and finished.

The present invention may be considered as a modification of the method and apparatus disclosed in my co-pending application, Serial Number 38,172, filed June 19, 1925.

The nature of the invention may be readily understood by reference to the accompanying drawing, in which:

Fig. 1 is a longitudinal section through a lathe attachment embodying my invention and showing a valve in position thereon for the machining of the valve seat nearest the face plate.

Fig. 2 is a similar view showing the valve shifted to a position to machine the seat remote from the face plate.

Fig. 3 is a front view of the device with the valve removed.

Fig. 4 is a detail view of a connection between the face plate and a part of the valve holder.

In the drawings, 5 designates the revolving shaft of a lathe or other suitable machine. At its terminal is the hub 6 of a face plate 7. It will be noted that the face plate is not perpendicular to the axis of the shaft, but is angularly offset with respect thereto, the degree of inclination from a perpendicular plane corresponding to the degree of inclination of the valve seats.

Fitted over the face plate, but rotatable thereon, is a flanged intermediate plate 8. On the front face of this plate is a diametrical groove 9. The front and rear surfaces of said intermediate plate are in parallelism. The plate may be retained in place by bolts 10 having T-heads 11 that hook over the back of the said face plate. Nuts $10^a$ are provided on the bolts for tightening or loosening them.

On the front of the flanged plate is a base plate 12 having a rib 13 which is fitted into the groove 9. This plate may be shifted transversely of the flanged plate, as it is adjustably secured thereto by bolts 14 on plate 8 passing through slots 15 in said base plate. Nuts $14^a$ are threaded on said bolts.

In the front of the base plate 12 is the circular foot 16 of a screw plug 17. Clamps 18 also secured in place by bolts 14 and nuts $14^a$ extend over the foot of the plug. Secured to the base plate by bolts and nuts 19 is a yoke, having a foot 20 which is slotted to receive the bolts, and which has arms 21 between which the valve A is disposed to facilitate the mounting of the valve.

In using the apparatus, the square faces of the valve are machine finished, and the end passages threaded so that all that is further necessary is the turning of the seats. The plug 17, which is removed from the base plate, is screwed tightly into one of the threaded ends of the valve. The plug with the attached valve is then clamped on the base plate with the T of the valve disposed between the arms of the yoke, and the yoke clamped in the proper position. At this time, the flanged plate is so mounted on the face plate that one of the valve seats, say seat $a'$ is in a plane perpendicular to the axis of rotation while the valve body is generally inclined to the axis of rotation, as clearly shown in Fig. 1, where X—X is the axis of rotation and line Y—Y is the axis of the valve.

As the longitudinal axis of the valve is then excentric to the axis of rotation, it is necessary to shift the valve laterally, until its longitudinal axis intersects the axis of rotation in the plane of the seat to be machined at point S. This is done by sliding the base plate on the flanged plate until the valve is in the position shown in Fig. 1. Then the valve may be rotated and a cutting tool entered through the open end of the valve until seat $a'$ has been machined, as shown in Fig. 1.

When this has been done, bolts 10 may be loosened and the flanged plate rotated exactly 180° and the bolts 10 again tightened. This throws the other seat, $a^2$ into a plane perpendicular to the axis of rotation, but throws the center of symmetry of the valve considerably to one side of the axis of rotation. The base plate is then shifted in an opposite direction until the longitudinal axis of the valve Y'—Y' intersects the axis of rotation in the plane of the seat $a^2$, this point of intersection being designated $s'$. The parts are then tightened, and the seat $a^2$ machined.

The value or necessity of having the plug 17 separate from the base plate will be appreciated when it is understood that the threads on the plug and valve will take up on different valves to different positions. Consequently, were the plug integral with the base plate, and were it screwed tightly into the valve, as is the plug 17, there is no assurance that in different valves, the angles of the valve seats would be properly disposed with respect to the angular surface of the face plate, with the consequence that the lateral shifting of the base plate, or the rotation of the flanged plate on the face plate, would not bring the seats of the different valves into the proper position or angle.

From the foregoing it will be seen that after the valve is once mounted, and this can be quite easily done, the valve does not need to be taken off the lathe or other machine until both seats have been completed. It will also be seen, that even if a slight error is made in initially setting the valve up, that both seats will retain the same inclination with respect to each other.

While I have specifically shown and described one particular construction of apparatus, it will be understood that this is merely by way of illustration, and that various changes and modifications may be made therein within the contemplation of the invention and under the scope of the appended claims. While I have particularly described the invention as applying to the machining of gate valves of the wedge-gate type, it will be obvious that the principal of the invention may be adapted to the machining of other articles than valves and can be used in connection with other machine tools than lathes.

I claim as my invention:

1. A device for finishing valves or the like, in combination with a face plate adapted for rotation having an angular face, an intermediate plate having substantially parallel surfaces, bolts to hook over the face plate to secure both of said plates together with said face and one of said surfaces in contact and permitting one of the plates to be turned to vary the relative positions of the plates, and a base plate having a radial rib adjustably interfitted in the other of said surfaces, said base plate having a central recess to accommodate a valve-securing member.

2. A device for finishing valves and the like, in combination with a face plate adapted for rotation having an angular face, an intermediate plate having substantially parallel surfaces and an annular flange to surround said face plate, said intermediate plate being rotatable relatively to the face plate for adjustment and having a radial slot, a base plate having a radial rib adjustably disposed in said slot, said base plate having a recess to receive a valve-carried part, clamps on the intermediate plate to overlap said base plate and slot, an element on the base plate having arms to facilitate mounting of a valve, and means carried by the intermediate plate for detachable hooking engagement with the face plate.

In testimony whereof I affix my signature.

ROBERT W. BISSELL.